United States Patent [19]

Rouverol

[11] 4,140,026
[45] Feb. 20, 1979

[54] CONFORMAL GEARING

[76] Inventor: William S. Rouverol, P.O. Box 9122, Berkeley, Calif. 94709

[21] Appl. No.: 771,884

[22] Filed: Feb. 25, 1977

[51] Int. Cl.² ............... F16H 55/14; F16H 55/06; F16H 57/00
[52] U.S. Cl. .................................. 74/461; 74/411; 74/462
[58] Field of Search .................... 74/461, 462, 411

[56] References Cited

U.S. PATENT DOCUMENTS

| | | | |
|---|---|---|---|
| 1,772,986 | 8/1930 | Dunham | 74/461 |
| 3,180,172 | 4/1965 | Leggatt | 74/462 |
| 3,371,552 | 3/1968 | Soper | 74/462 |
| 3,982,445 | 9/1976 | Rouverol | 74/462 |

Primary Examiner—Leonard H. Gerin
Attorney, Agent, or Firm—Gordon Wood

[57] ABSTRACT

The principal disadvantage of conformal gearing is its acute sensitivity to center-distance error. An improved type of all-addendum conformal gearing is disclosed in which the concave tooth is much more flexible than the convex tooth, so that if the gears are mounted at too great a center-distance, the tendency of the tooth load to be exerted on the tip of the concave tooth is offset by tooth flexure which shifts the arc center of the concave profile a considerable distance toward the axis of the gear with convex teeth. This increases the pressure angle sufficiently to prevent overloading of the tip of the concave tooth.

8 Claims, 2 Drawing Figures

CONFORMAL GEARING

The main obstacle to successful application of conformal (concave-convex) gearing is control of center-distance. Previously there have been two ways employed to reduce this sensitivity to center-distance error. In most cases a considerable difference, up to about 15%, in the radii of the concave and convex profiles has been used. Also, it has been proposed to make the profiles slightly spiral rather than circular arcs (U.S. Pat. Nos. 3,937,098 and 3,982,445).

The difficulty with both these methods is that they do not afford a solution that allows the gears to have the maximum service life. This is because conformal gears increase their conformity as they wear, gradually acquiring profiles that are almost perfect circular arcs in the transverse plane with arc centers that get closer and closer to the pitch point.

Once conformal gears have worn into this "hyperconformal" condition, with profile arc centers that are both substantially at the pitch point, any minor increase in load that increases the shaft deflections, or any additional bearing wear, causes the profile arc centers to approach the common tangent plane and the pressure angle to approach zero. This shifts the entire tooth load to the tip of the concave teeth, and failure may quickly ensue. It has in fact been observed that conformal gears that have given satisfactory service for many years often suddenly fail as a result of breakage of the concave teeth. There seems little doubt that it is this increased sensitivity to center-distance error combined with a momentary increase in load or the inevitable gradual increase in bearing wear late in the service life that causes the failure.

It is therefore the main object of the invention to devise a tooth profile form that will have the main advantages of closely conforming profiles, namely increased torque capacity, but which will eliminate the tendency of conformal gears to fail late in their service life because of increased sensitivity to center-distance changes as the gears wear into closer and closer conformity.

Other objects and advantages of the invention will be evident from the drawings and specification that follow.

Figure 1:
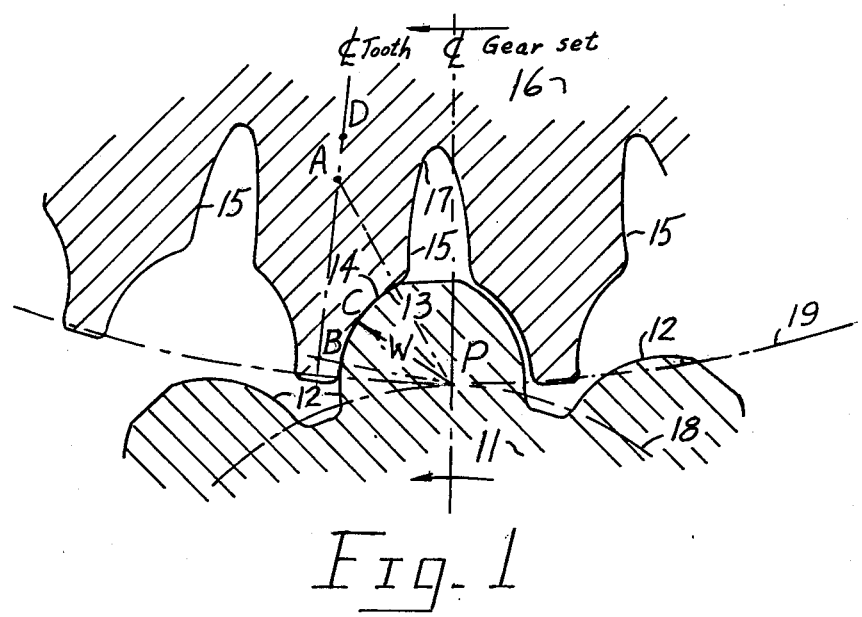
FIG. 1 is a partial transverse section of a pair of mating gears embodying the invention, showing typical teeth.

In detail and referring to the drawings, FIG. 1 shows pinion 11 with typical teeth 12 having convex working surfaces 13 engaging the concave working surfaces 14 of the teeth 15 of the gear 16. The convex teeth 12 are all-addendum, and the concave teeth 15 are all-dedendum, the latter having deep gashes 17 cut between adjacent teeth to increase their flexibility. (Other parts of the pinion 11 and gear 16, such as rims, webs, hubs, etc., are of conventional construction and are omitted in the interest of clarity.)

When the gear set is mounted at the correct center-distance and is transmitting torque, the pitch circles 18, 19 are tangent at the pitch point P, which is also the center of both the convex and concave circular arc tooth profiles 13, 14. The resultant tooth load W passes substantially through C, the midpoint of the tooth working surfaces.

If the gears 11, 16 are mounted on centers that are too close, the tooth load W tends to act in the direction PA, and there is very little flexure of the tooth 15. If on the other hand the center-distance is too great, the load line will be more in the direction PB, and there will be considerable flexure of the concave tooth 15. This is because the tangential component of tooth load W is applied to the concave tooth at point B, which is a considerable distance from the tooth base at D. The effective moment arm BD is so long that the tooth 15 bends considerably and produces the effect diagrammed in FIG. 2.

Figure 2:
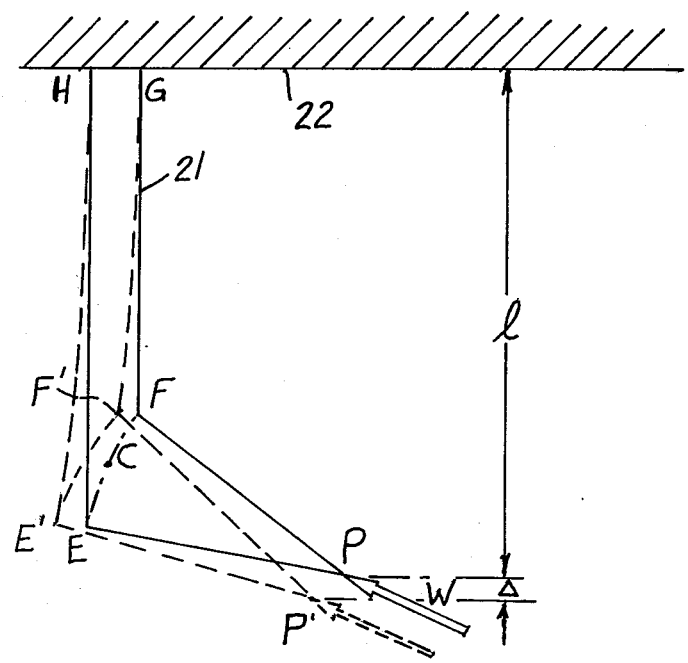
FIG. 2 is a schematic diagram of a cantilever beam with a triangular extension at its free end, showing by means of broken lines how flexure of the beam in response to a load W moves the apex of the triangle away from the base of the beam.

In FIG. 2 a plain cantilever beam 21 is encastered in a solid base 22. The end of the beam 21 has a triangular extension FPE that makes a considerable angle GFP with the direction of the encastered portion of the beam 21. The apex P of the triangular portion FPE is equidistant from F and E, so that it may be considered to be the center of a circular arc (shown as a dotted line) connecting E and F.

When a load W is applied to this structure of FIG. 2, at the point P and in a direction so as to intersect the arc EF substantially at its midpoint C, the encastered portion 21 of the structure will deflect by a distance FF' and its end portion FE will also rotate through an angle that varies directly with the load W and the square of the length of the encastered portion (from C to the base HG). This rotation of the arc EF to the position E'F' rotates the triangular portion FPE to the position F'P'E', shown in broken line. The center P of the arc EF moves not only to the left, but because of the rotation ("increased slope") of the end of the beam 21, it rotates to position E'F' and the point P moves *down*, by a distance shown as Δ.

In terms of the gear tooth drawing of FIG. 1, this movement of point P *away* from the base 22 in FIG. 2 is tantamount to moving the center of the gear 15 *closer* to the center of the pinion 11, and hence shifting the load line from the direction PC (or at worst PB) to the direction PA. In other words, the increased flexibility of the concave tooth 15 effected by the gash 17 will produce an automatic correction for an overly great center-distance. Since it is this kind of mounting error that produces overloading of the tips of the concave teeth in conventional conformal gearing, the increased flexibility of the concave teeth 15 may be said to provide automatic correction for the kinds of center-distance error that cause tooth breakage.

It will be apparent that there are alternative methods of increasing the flexibility of the concave teeth. Many forms of gash or cut 17 may be used, although most will induce greater root stresses than the parabolic contour shown in FIG. 1. Alternatively the slot 17 may be partly or entirely eliminated if the gear 16 has teeth 15 made of a material having a much lower modulus of elasticity than that of the teeth 12 of the pinion 11. For example, the gear teeth 15 may be plastic while the pinion teeth 12 are metal. Or the teeth of both may be made of plastics but those of the pinion 11 reinforced with glass or other filler to make them less flexible. In general, the problem of dimensional instability of plastics or similar materials that may be used for the concave teeth can be alleviated by making the hub and web of the gear that carries the concave teeth out of a material that has a low coefficient of thermal expansion, as for example metal.

The amount of correctional movement Δ of the arc center P in FIG. 2 will depend not only on the magnitude and direction of the load W, but also on the ratio of length-to-thickness of the cantilever beam 21 and on the modulus of elasticity of the beam material. Therefore, to obtain a sufficient amount of this kind of correctional movement in actual gear teeth, so that typical center-distance errors will be offset, the flexibility of the concave teeth (i.e., the amount they bend under a given tangential load) must usually be at least three times that of the convex teeth. This increased flexibility may be obtained by using either a larger length-to-thickness ratio than that of the convex teeth, or a lower modulus of elasticity, or a combination of these characteristics.

As in conventional conformal gearing, the teeth are formed to circular arcs in either the transverse or normal plane, with centers at or adjacent to the common pitch element. Maximum tooth surface load capacity will be obtained when the radii of the concave and convex tooth profile arcs are substantially identical. However, the radius of the concave arc may be made five or ten percent larger than that of the convex arc if the application is one in which it is practical to allow the gears to adjust themselves, during a running-in phase, to the center-distance at which they have been installed, or, alternatively, to rate the gears at a slightly lower torque capacity than the one they will have when the profile radii have become substantially the same.

If the gearing herein disclosed is to have the smoothest and quietest operation, the teeth should be helical (or spiral in the case of bevel gears). Only in gear sets where the pinion has a very large number of teeth or the gear is internal, or both, will it be feasible to use straight spur or bevel teeth. Tooth silhouetting of the type indicated in U.S. Pat. No. 3,982,444 is applicable.

It will be evident that the teeth shown in FIG. 1 need not be symmetrical. In gear sets where there is a large torque applied in one direction but not in the other, the tooth working surfaces 13, 14 that receive the greater torque load may be conformal, as shown, but the opposite sides of the teeth may be involute or other mating profile curves.

I claim:

1. In a pair of mating gears,
   a first gear having teeth formed to working profiles that are substantially convex circular arcs,
   a second gear having teeth formed to working profiles that are substantially concave circular arcs,
   said teeth of said second gear being made of a material having a particular modulus of elasticity and also having a ratio of whole depth to tooth thickness that together cause said teeth to bend under load at least three times as far as said teeth of said first gear.

2. A pair of mating gears according to claim 1 wherein the radii of said concave circular arcs are less than ten percent greater than the radii of said convex circular arcs.

3. A pair of mating gears according to claim 1 wherein the whole depth of the teeth on said second gear is substantially greater than that of the teeth of said first gear.

4. A pair of mating gears according to claim 3 wherein the whole depth of the teeth of said second gear includes the depth of a slot interposed between adjacent teeth to increase the flexibility of said teeth.

5. A pair of mating gears according to claim 4 wherein the profile of said slot is a curve of an approximately parabolic form.

6. A pair of mating gears according to claim 1 wherein said working profiles are circular arcs in the transverse plane.

7. A pair of mating gears according to claim 1 wherein said working profiles are circular arcs in planes normal to the tooth flanks.

8. A pair of mating gears according to claim 1 wherein the centers of said circular arcs are substantially at the common pitch element of said pair.

* * * * *